US011032591B2

United States Patent
Zheng

(10) Patent No.: US 11,032,591 B2
(45) Date of Patent: Jun. 8, 2021

(54) TIME DIVISION MULTIPLEXING METHOD FOR DECODING HARDWARE

(71) Applicant: AMLOGIC (SHANGHAI) CO., LTD., Shanghai (CN)

(72) Inventor: Shihong Zheng, Shanghai (CN)

(73) Assignee: AMLOGIC (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 16/710,260

(22) Filed: Dec. 11, 2019

(65) Prior Publication Data

US 2020/0186845 A1   Jun. 11, 2020

(30) Foreign Application Priority Data

Dec. 11, 2018   (CN) .......................... 201811512216.0

(51) Int. Cl.
| | |
|---|---|
| H04N 21/2389 | (2011.01) |
| H04N 19/156 | (2014.01) |
| H04N 19/44 | (2014.01) |
| H04N 21/418 | (2011.01) |

(52) U.S. Cl.
CPC ....... *H04N 21/2389* (2013.01); *H04N 19/156* (2014.11); *H04N 19/44* (2014.11); *H04N 21/4183* (2013.01)

(58) Field of Classification Search
CPC .. H04N 21/2389; H04N 19/156; H04N 19/44; H04N 21/4183; H04N 19/423; H04N 19/42; H04N 7/147
See application file for complete search history.

(56) References Cited

U.S. PATENT DOCUMENTS

| | | | | |
|---|---|---|---|---|
| 2006/0043186 | A1* | 3/2006 | Nadabar | ............... G06K 7/14 |
| | | | | 235/462.1 |
| 2011/0134996 | A1* | 6/2011 | Nandy | ................ H04N 19/44 |
| | | | | 375/240.02 |
| 2011/0274178 | A1* | 11/2011 | Onno | .................... H04N 19/70 |
| | | | | 375/240.25 |

(Continued)

FOREIGN PATENT DOCUMENTS

| | | |
|---|---|---|
| CN | 102547294 A | 7/2012 |
| CN | 106131563 A | 11/2016 |

*Primary Examiner* — Sam K Ahn
*Assistant Examiner* — Amneet Singh
(74) *Attorney, Agent, or Firm* — Kyle M. James; Rutan & Tucker, LLP

(57) ABSTRACT

The invention relates to the technical field of software systems, and more particularly, to a time division multiplexing method for decoding hardware. The method comprises: Step S1, providing a decoding hardware; Step S2, instantiating the decoding hardware into a first decoder and a second decoder; and Step S3, decoding a first data stream through the first decoder, and decoding a second data stream through the second decoder. Compared to the prior art, the present invention has the advantages that the efficiency of the decoder is improved, and the detect that the efficiency is insufficient due to the fact that the decoder runs under high-load decoding through software when the decoder is insufficient in video call application is overcome, and meanwhile, under the condition that multiple hardware decoders exist, the hardware resources are saved, and a new idea is provided for the running cost.

16 Claims, 2 Drawing Sheets

(56) References Cited

U.S. PATENT DOCUMENTS

| | | | |
|---|---|---|---|
| 2013/0202044 A1* | 8/2013 | Kitamura | H04N 19/172 375/240.16 |
| 2013/0235159 A1* | 9/2013 | Kim | H04N 19/172 348/43 |
| 2018/0063548 A1* | 3/2018 | Namjoshi | H04L 65/80 |

* cited by examiner

TIME DIVISION MULTIPLEXING METHOD FOR DECODING HARDWARE

CROSS-REFERENCE TO RELATED APPLICATIONS

The present application claims the benefit of and priority to Chinese Patent Application No. CN 201811512216.0, filed on Dec. 11, 2018, the entire content of which is incorporated herein by reference.

BACKGROUND OF THE INVENTION

Field of the Invention

The invention relates to the technical field of software systems, and more particularly, to a time division-multiplexing method for decoding hardware.

Description of the Related Art

In the prior art, as seen from FIG. 1, for vide call application of video equipments, local USB cameras generally uses output images in MJPEG format. Compared with the earlier YUV uncompressed format, the MJPEG format can support higher resolutions, and images with a higher frame rate occupy less system resources. When processing a video call, the video equipment needs to decode data in MJPEG format commonly used by the local USB cameras, besides to decode remote video encoded and compressed data. Typically, in order to decode data from two channels, a dual-hardware decoder or a combination of a soft solution and a hard solution are used. However, such methods have the defect that the efficiency is insufficient due to the fact that the decoder runs under high-load decoding through software when the decoder is insufficient in video call application.

For the two methods as mentioned above, the dual-hardware decoder has a higher efficiency but occupies more hardware resources, so the decoder is not fully used as expected, and its resources are wasted. When only one decoder is involved, it tends to use the combination of the soft solution and the hard solution. Such a method often applies a large load on a chip, especially when the chip is processing other high-load operations, such that video call quality is affected.

SUMMARY OF THE INVENTION

Given that the foregoing problems exist in the prior art, the present invention provides a time division multiplexing method for decoding hardware.

The detailed technical solutions are as follows:

A time division multiplexing method for decoding hardware, comprising
- Step S1, providing a decoding hardware;
- Step S2, instantiating the decoding hardware into a first decoder and a second decoder; and
- Step S3, decoding a first data stream through the first decoder, and decoding a second data stream through the second decoder.

Preferably, the first decoder and the second decoder are configured to time division multiplex the decoding hardware.

Preferably, the first data stream comprises a data stream in MJPEG format; and/or the second data stream comprises a data stream in H.264 format.

Preferably, a process for decoding the first data stream comprises:
- Step S30, loading a decoding firmware corresponding to the format of first data stream, to decode the first data stream;
- Step S31, determining whether the first data stream is successfully decoded;
- if yes, then decoding the first data stream into a decoded video frame;
- if no, then returning to Step S30.

Preferably, after completing Step S31, saving contextual information corresponding to the first data stream.

Preferably, Step S30 comprises:
- Step S300, the first decoder loads the decoding firmware corresponding to the format of the first data stream;
- Step S301, determining whether the decoding firmware has been successfully loaded by the first decoder;
- if yes, decoding header information of the first data stream, then decoding the first data stream;
- if no, then returning to Step S300 for reloading.

Preferably, the process for decoding the first data stream further comprises:
- determining whether the first data stream is decoded for the first time;
- if yes, then decoding header information of the first data stream, and decoding the first data stream;
- if no, then recovering the contextual information, and decoding the first data stream.

Preferably, the process for decoding the first data stream further comprises:
- determining whether the contextual information is successfully recovered;
- if yes, then decoding the first data stream;
- if no, then returning to Step S30.

Preferably, the contextual information comprises configuration information of the first data stream decoded in a previous time.

Preferably, a pre-preparation step is executed in prior to Step S3, the pre-preparation step comprises:
- determining whether the first decoder and the second decoder are in an idle state, and
- whether the first decoder and the second decoder have sufficient output buffers; and
- whether the first decoder and the second decoder are ready for the Step S3;
- if yes, then turning to Step S3;
- if no, then returning to the pre-preparation step.

By adopting the technical solutions, the present invention has the advantages or beneficial effects. A time division-multiplexing method for decoding hardware is disclosed. According to the method, the efficiency of the decoder is improved, and the defect that the efficiency is insufficient due to the fact that the decoder runs under high-load decoding through software when the decoder is insufficient in video call application is overcome, and meanwhile, under the condition that multiple hardware decoders exist, the hardware resources are saved, and a new idea is provided for the running cost.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
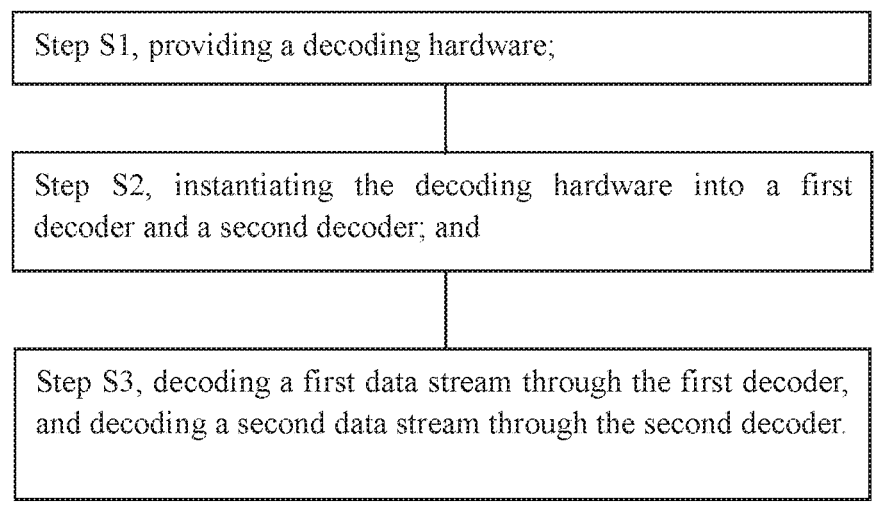
FIG. 1 is a flowchart illustrating steps of a time division multiplexing method for decoding hardware according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

In the prior art, for video call application of video equipments, local USB cameras generally uses output images in MJPEG format. Compared to the earlier YUV uncompressed format, the MJPEG format can support higher resolutions and images with a higher frame rate, and can occupy less system resources. When processing a video call, the video equipment needs to decode data in MJPEG format commonly used by the local USB cameras, besides to decode remote video encoded and compressed data. Typically, in order to decode data from two channels, a dual-hardware decoder or a combination of a soft solution and a hard solution are used. However, such methods have the defect that the efficiency is insufficient due to the fact that the decoder runs under high-load decoding through software when the decoder is insufficient in video call application.

Given that the foregoing problems exist in the prior art, the present invention provides a time division-multiplexing method for decoding hardware, comprising:

Step S1, providing a decoding hardware;

Step S2, instantiating the decoding hardware into a first decoder and a second decoder; and Step S3, decoding a first data stream through the first decoder, and decoding a second data stream through the second decoder.

In a preferred embodiment, the first decoder and the second decoder are configured to time division multiplex the decoding hardware.

In a preferred embodiment, the first data stream comprises a data stream in MJPEG format; and/or the second data stream comprises a data stream in H.264 format.

With reference to FIG. 1, in the time division multiplexing method for decoding hardware, firstly, a decoding hardware is provided; two-channel decoding is abstracted into two instances; the two instances are set alternatively for moving on to a pre-preparation step; and decoding process is started. Wherein, the first decoder and the second decoder are configured to time division multiplex the decoding hardware. The first data stream comprises a data stream in MJPEG format, and the second data stream comprises a data stream in H.264 format.

Furthermore, a pre-preparation step is executed in prior to Step S3, the pre-preparation step comprises: determining whether the first decoder and the second decoder are in an idle state, and whether the first decoder and the second decoder have sufficient output buffers; and whether the first decoder and the second decoder are ready for the Step S3; if yes, then turning to Step S3; if no, then returning to the pre-preparation step.

Furthermore, the time division-multiplexing of a single decoder requires efficient management of the decoder. At the input end, it is necessary to determine the amount of data to be decoded per unit time and design input and output buffers based on characteristics of the video stream, such that a phenomenon of excessive time spent on decoding data in one channel can be avoided. In addition, during the decoding process, MJPEG and H.264 have their own decoding rule, so different decoding control firmware is needed. When implementing the time division multiplexing decoding by switching between the two decoders, the key factor for the success of the decoding operation lies in the storage and recovery of the contextual information.

Furthermore, the efficiency of the decoder is improved, and the defect that the efficiency is insufficient due to the fact that the decoder runs under high-load decoding through software when the decoder is insufficient in video call application is overcome, and meanwhile, under the condition that multiple hardware decoders exist, the hardware resources are saved, and a new idea is provided for the running cost.

In a preferred embodiment, a process for decoding the first data stream comprises:

Step S30, loading a decoding firmware corresponding to the format of the first data stream, to decode the first data stream;

Step S31, determining whether the first data stream is successfully decoded;

if yes, then decoding the first data stream into a decoded video frame;

if no, then returning to Step S30.

After completing Step S31, saving contextual information corresponding to the first data stream.

Furthermore, Step S30 comprises:

Step S300, the first decoder loads the decoding firmware corresponding to the format of the first data stream;

Step S301, determining whether the decoding firmware has been successfully loaded by the first decoder;

if yes, then decoding the first data stream;
if no, then returning to Step S300 for reloading.

Figure 2:
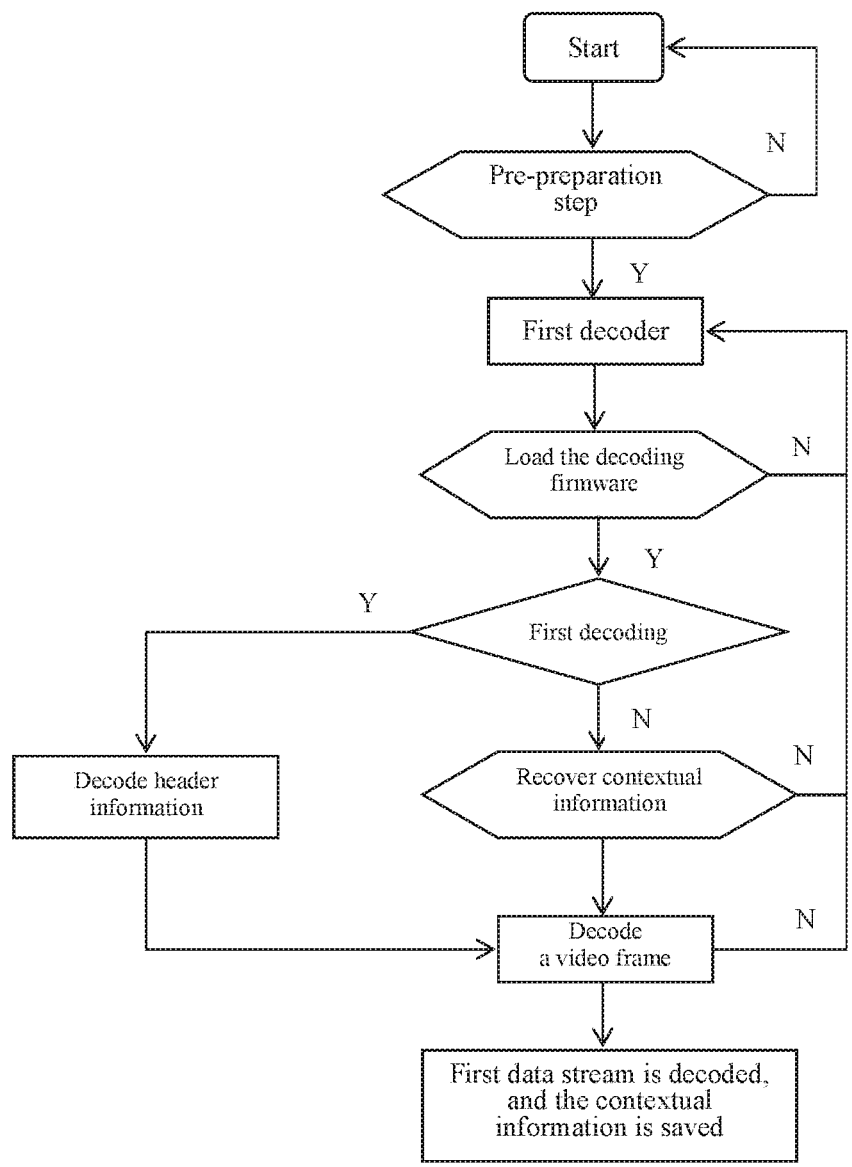
FIG. 2 is a flowchart illustrating a process for decoding a first data stream according to an embodiment of the present invention.

Specifically, as shown in FIG. 2, the first decoder and the second decoder are configured to time division multiplex the decoding hardware. For example, the first decoder and the second decoder use the decoding hardware alternatively and the decoding process of the first data stream is the same as that of the second data stream. In this embodiment, only the decoding process of the first data stream is described. The following step is to determine whether the first data stream is successfully decoded: if decoding timeout or decoding errors occur, it is determined that a video frame fails to be decoded, or the decoding firmware fails to be loaded, or the contextual information fails to be recovered, or the decoding operation fails, or it is lost after decoding operation manages to save the contextual information, etc., then turning to Step S30.

Then the first decoder loads a decoding firmware corresponding to the format of the first data stream, to decode the first data stream. In this process, it is determined whether the decoding firmware is successfully loaded; if yes, continuing to decode the first data stream; if not, returning to previous step for reloading the decoding firmware.

Furthermore, the time division-multiplexing of a single decoder requires efficient management of the decoder. At the input end, it is necessary to determine the amount of data to be decoded per unit time and design input and output buffers based on characteristics of the video stream, such that a phenomenon of excessive time spent on decoding data in one channel can be avoided. In addition, during the decoding process, MJPEG and H.264 have their own decoding rule, so different decoding control firmware is needed. When implementing the time division multiplexing decoding by switching between the two decoders, the key factor for the success of the decoding operation lies in the storage and recovery of the contextual information. Therefore, after the first data stream is decoded into decoded video frames, the contextual information corresponding to the first data stream is saved. The saved contextual information comprises configuration information of output buffeting from the decoding operation, variable of the decoding environment, and register values.

Furthermore, the efficiency of the decoder is improved, and the defect that the efficiency is insufficient due to the fact that the decoder runs under high-load decoding through software when the decoder is insufficient in video call application is overcome, and meanwhile, under the condition that multiple hardware decoders exist, the hardware resources are saved, and a new idea is provided for the running cost.

In a preferred embodiment, the process for decoding the first data stream further comprises:
  determining whether the first data stream is decoded for the first time;
  if yes, then decoding header information of the first data stream, and decoding the first data stream;
  if no, then recovering the contextual information, and decoding the first data stream;
  wherein the contextual information comprises configuration information of the first data stream previously decoded.

Specifically, as shown in FIG. 2, the first decoder and the second decoder are configured to time division multiplex the decoding hardware. For example, the first decoder and the second decoder use the decoding hardware alternatively, and the decoding process of the first data stream is the same as that of the second data stream. In this embodiment, only the decoding process of the first data stream is described. In the above-mentioned technical solution, the header information of the first data stream comprises, but is not limited to, update time, data length, format of the first data stream, and the like.

Furthermore, the time division-multiplexing of a single decoder requires efficient management of the decoder. At the input end, it is necessary to determine the amount of data to be decoded per unit time and design input and output buffers based on characteristics of the video stream, such that a phenomenon of excessive time spent on decoding data in one channel can be avoided. In addition, during the decoding process, MJPEG and H.264 have their own decoding rule, so different decoding control firmware is needed. When implementing the time division multiplexing decoding by switching between the two decoders, the key factor for the success of the decoding operation lies in the storage and recovery of the contextual information. Therefore, in this embodiment, the recovered contextual information comprises configuration formation of the first data stream previously decoded.

Furthermore, the efficiency of the decoder is improved, and the defect that the efficiency is insufficient due to the fact that the decoder runs under high-load decoding through software when the decoder is insufficient in video call application is overcome, and meanwhile, under the condition that multiple hardware decoders exist, the hardware resources are saved, and a new idea is provided for the running cost.

In a preferred embodiment, the process for decoding the first data stream further comprises:
  determining whether the contextual information is successfully recovered;
  if yes, then decoding the first data stream;
  if no, then returning to Step S30.

Specifically, as shown in FIG. 2, the time division multiplexing of a single decoder requires efficient management of the decoder. At the input end, it is necessary to determine the amount of data to be decoded per unit time and design input and output buffers based on characteristics of the video stream, such that a phenomenon of excessive time spent on decoding data in one channel can be avoided. In addition, during the decoding process, MJPEG and H.264 have their own decoding rule, so different decoding control firmware are needed. When implementing the time division multiplexing decoding by switching between the two decoders, the key factor for the success of the decoding operation lies in the storage and recovery of the contextual information.

Furthermore, the efficiency of the decoder is improved, and the defect that the efficiency is insufficient due to the fact that the decoder runs under high-load decoding through software when the decoder is insufficient in video call application is overcome, and meanwhile, under the condition that multiple hardware decoders exist, the hardware resources are saved, and a new idea is provided for the running cost.

It is noted that in the invention, the decoding hardware, the first decoder, the second decoder, and the decoding firmware all can be implemented by the decoder in the field, and the decoding process of the first data stream can be implemented by the method in the field, which does not affect the time division multiplexing method and technical effect of the decoding hardware.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A time division multiplexing method for decoding hardware, comprising:

Step S1, providing a single decoding hardware;

Step S2, instantiating the decoding hardware into a first decoder and a second decoder; and Step S3, decoding a first data stream through the first decoder, and decoding a second data stream through the second decoder, wherein a process for decoding the first data stream comprises:

Step S30, loading a decoding firmware corresponding to the format of the first data stream, to decode the first data stream;

Step S300, the first decoder loads the decoding firmware corresponding to the format of the first data stream;

Step S31, determining whether the first data stream is successfully decoded;

if yes, decoding a header information of the first data stream, then decoding the first data stream into a decoded video frame and saving contextual information corresponding to the first data stream wherein the saved contextual information comprises configuration information of output buffeting from the decoding operation, variable of the decoding environment, and register values;

if no, then returning to Step 300.

2. The time division multiplexing method for decoding hardware of claim 1, wherein the first decoder and the second decoder are configured to time division multiplex the decoding hardware.

3. The time division multiplexing method for decoding hardware of claim 1, wherein the first data stream comprises a data stream in a Motion Joint Photographic Experts Group (MJPEG) format, and/or the second data stream comprises a data stream in H.264 format.

4. The time division multiplexing method for decoding hardware of claim 1, wherein Step S30 further comprises: Step S301, determining whether the decoding firmware has been successfully loaded by the first decoder; if yes, then decoding the first data stream; if no, then returning to Step S300 for reloading.

5. The time division multiplexing method for decoding hardware of claim 4, wherein the process for decoding the first data stream further comprises:

determining whether the contextual information is successfully recovered;

if yes, then decoding the first data stream;

if no, then returning to Step S300.

6. The time division multiplexing method for decoding hardware of claim 1, wherein the process for decoding the first data stream further comprises:

determining whether the first data stream is decoded for a first time;

if yes, then decoding the header information of the first data stream, and decoding the first data stream; if no, then recovering the contextual information, and decoding the first data stream.

7. The time division multiplexing method for decoding hardware of claim 6, wherein the contextual information comprises configuration information of the first data stream decoded in a previous time.

8. The time division multiplexing method for decoding hardware of claim 1, wherein a pre-preparation step is executed in prior to Step S3, the pre-preparation step comprises:

determining whether the first decoder and the second decoder are in an idle state, and whether the first decoder and the second decoder have sufficient output buffers; and whether the first decoder and the second decoder are ready for the Step S3;

if yes, then turning to Step S3;

if no, then returning to the pre-preparation step.

9. The time division multiplexing method for decoding hardware of claim 1, wherein the first decoder and the second decoder are configured to perform time division multiplexing on the decoding hardware.

10. The time division multiplexing method for decoding hardware of claim 1, wherein the first data stream comprises a data stream in a Motion Joint Photographic Experts Group (MJPEG) format, or the second data stream comprises a data stream in H.264 format.

11. A time division multiplexing method for decoding hardware, comprising:

providing a single decoding hardware;

instantiating the decoding hardware into a first decoder and a second decoder; and decoding a first data stream through the first decoder, and decoding a second data stream through the second decoder, wherein decoding the first data stream includes:

loading a decoding firmware corresponding to the format of the first data stream to decode the first data stream, determining whether the first data stream is successfully decoded, when the first data stream is successfully decoded, decoding header information of the first data stream, then decoding the first data stream into a decoded video frame, saving contextual information corresponding to the first data stream wherein the saved contextual information comprises configuration information of output buffeting from the decoding operation, variable of the decoding environment, and register values; and when the first data stream is not successfully decoded, returning to loading the decoding firmware corresponding to the format of the first data stream, to decode the first data stream.

12. The time division multiplexing method for decoding hardware of claim 11, wherein determining whether the first data stream is successfully decoded includes:

loading, by the first decoder, the decoding firmware corresponding to the format of the first data stream, determining whether the decoding firmware has been successfully loaded by the first decoder, when the first data stream is successfully loaded, decoding the first data stream, and when the first data stream is not successfully decoded, returning to loading the decoding firmware by the first decoder.

13. The time division multiplexing method for decoding hardware of claim 12, wherein the process for decoding the first data stream further includes:

determining whether the contextual information is successfully recovered, when the contextual information is successfully recovered, decoding the first data stream, and when the contextual information is not successfully recovered, returning to loading the decoding firmware corresponding to the format of the first data stream, to decode the first data stream.

14. The time division multiplexing method for decoding hardware of claim 11, wherein the process for decoding the first data stream further includes:
- determining whether the first data stream is decoded for a first time,
- when the first data stream is decoded for the first time, decoding both the header information of the first data stream and the first data stream, and
- when the first data stream has not been decoded for the first time, recovering the contextual information, and decoding the first data stream.

15. The time division multiplexing method for decoding hardware of claim 14, wherein the contextual information includes configuration information of the first data stream decoded in a previous time.

16. The time division multiplexing method for decoding hardware of claim 11, wherein a pre-preparation step is executed prior to decoding the first data stream and the second data stream, the pre-preparation step including a set of determinations including:
- (i) determining whether the first decoder and the second decoder are in an idle state,
- (ii) determining whether the first decoder includes a first output capable of storing the first data stream and the second decoder includes a second output capable of storing the second data stream, and
- (iii) determining whether the first decoder and the second decoder are ready for the decoding of the first data stream and the second data stream,
- when the set of determinations are satisfied, turning to decoding the first data stream and the second data stream;
- when at least one of the set of determinations is not satisfied, returning to the pre-preparation step.

* * * * *